(12) United States Patent
Rusev et al.

(10) Patent No.: US 12,248,811 B2
(45) Date of Patent: *Mar. 11, 2025

(54) REDISTRIBUTING UPDATE RESOURCES DURING UPDATE CAMPAIGNS

(71) Applicant: Omnissa, LLC, Mountain View, CA (US)

(72) Inventors: Sabo Rusev, Sofia (BG); Ivo Petkov, Sofia (BG); Ilya Mayorski, Sofia (BG); Plamen Penev, Sofia (BG); Kristiyan Yankov, Sofia (BG)

(73) Assignee: Omnissa, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,676

(22) Filed: Jan. 18, 2022

(65) Prior Publication Data

US 2022/0269539 A1  Aug. 25, 2022

Related U.S. Application Data

(63) Continuation of application No. 16/702,708, filed on Dec. 4, 2019, now Pat. No. 11,256,544.

(51) Int. Cl.
| | |
|---|---|
| *G06F 9/46* | (2006.01) |
| *G06F 8/65* | (2018.01) |
| *G06F 9/38* | (2018.01) |
| *G06F 9/445* | (2018.01) |
| *G06F 9/50* | (2006.01) |

(52) U.S. Cl.
CPC .............. *G06F 9/5005* (2013.01); *G06F 8/65* (2013.01); *G06F 9/3836* (2013.01); *G06F 9/44505* (2013.01); *G06F 2209/503* (2013.01); *G06F 2209/504* (2013.01)

(58) Field of Classification Search
CPC ..... G06F 9/5005; G06F 8/65; G06F 2209/503
See application file for complete search history.

(56) References Cited

U.S. PATENT DOCUMENTS

| | | | |
|---|---|---|---|
| 9,229,902 B1 | 1/2016 | Leis et al. | |
| 9,342,291 B1* | 5/2016 | Guo | ........................... G06F 8/65 |
| 10,841,791 B1* | 11/2020 | Zhang | ................... H04W 72/51 |
| 2010/0325637 A1 | 12/2010 | Radmilac et al. | |
| 2012/0137002 A1 | 5/2012 | Ferris et al. | |

(Continued)

*Primary Examiner* — Diem K Cao
(74) *Attorney, Agent, or Firm* — Kim & Stewart LLP

(57) ABSTRACT

Disclosed are various embodiments for the controlling the amount of active updates that can occur during a given time on devices that are associated with tenants (e.g., organizations) and subtenants (e.g., sub-organizations) in a multi-tenant environment. In particular, each tenant and subtenant is assigned throttle corresponding to different update parameters (e.g., an amount of devices executing an active update, an amount of data to be downloaded during a campaign, a time for completing the update campaign, etc.). When an update campaign is established, the update campaign can define the different devices that are to be updated. In some situations, the number of active updates required may exceed the allotted resources for a given subtenant. When a subtenant requires additional resources than what is assigned to complete the update, the subtenant can borrow resources defined by the update parameters from a subtenant peer that has a surplus.

20 Claims, 4 Drawing Sheets

(56) References Cited

U.S. PATENT DOCUMENTS

2013/0305245 A1* 11/2013 Doddavula .......... G06F 9/5083
  718/1
2017/0318091 A1 11/2017 Ke et al.

* cited by examiner

REDISTRIBUTING UPDATE RESOURCES DURING UPDATE CAMPAIGNS

CROSS-REFERENCE TO RELATED APPLICATIONS

This application is a continuation of and claims benefit to U.S. patent application Ser. No. 16/702,708 filed on Dec. 4, 2019, the entire contents of which are hereby incorporated herein by reference.

BACKGROUND

Appliances, vehicles, sensors, controllers, actuators, and other devices can gather data and interact with the physical world. This network of devices or Internet-of-Things (IoT) can be utilized to improve operations and provide new services. Different types of IoT devices have different capabilities that can be useful in interacting with the physical world. For example, appliances have network connectivity and computing components, allowing household appliances such as a refrigerator to reorder food from the grocery store for delivery or for a washing machine or a dryer to send an alert to a smartphone indicating that the appliance is finished. Automobiles have network connectivity, allowing individual components of the automobile to connect to the Internet, such as, allowing the radio to stream music from the Internet. Even thermostats and sprinkler controllers have network connectivity, allowing adjustment of settings based on weather reports downloaded from the Internet or remote adjustment of settings using a smartphone or computing device. In order to access a network, IoT devices can connect through a gateway or another edge device.

In order to ensure the security and reliability of IoT device connections in an enterprise setting, the enterprise can utilize a management service capable of managing the network of IoT devices. However, the scale of the Internet of Things presents a number of management issues. For example, where an enterprise can have had a few hundred computers that could be manually updated by an information technology (IT) department, the number of devices in the Internet of Things can result in tens of thousands of network connected devices being deployed in an enterprise environment. Management of these devices, such as requirements to deploy software updates, at such scale strains the resources of not just IT departments, but also of many automated solutions employed by enterprises for managing network connected devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
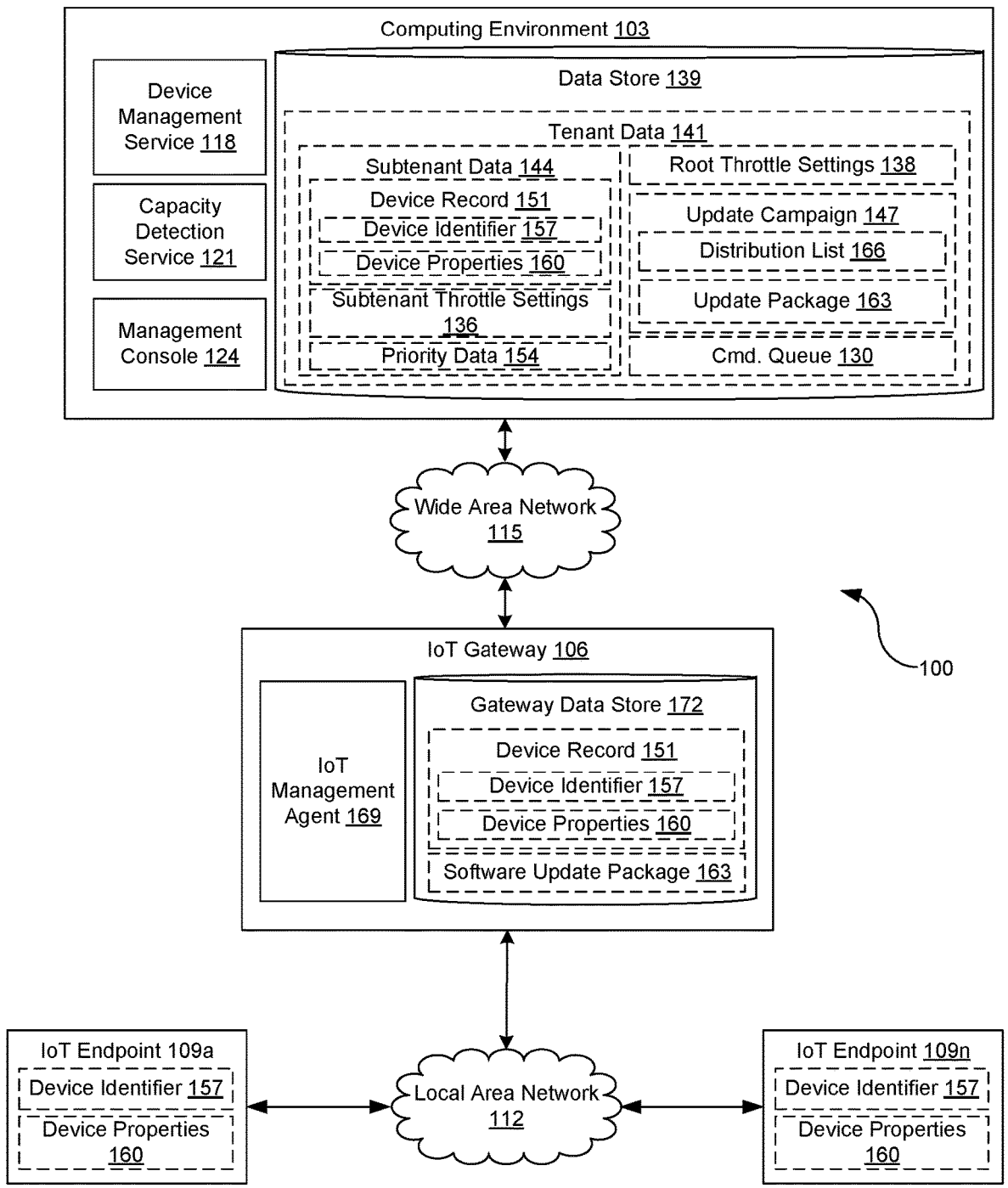
FIG. 1 is a drawing illustrating an example arrangement of a network environment according to various embodiments of the present disclosure.

Disclosed are various approaches for managing the distribution of software update packages to a network connected devices, such as Internet of Things (IoT) devices. Various applications or operating systems can be installed on IoT devices. As new versions of these applications or device firmware become available, an administrator might be tasked with updating a large number of IoT devices with updated firmware and applications. However, in order to cause the new versions of the applications or device firmware to be installed on the managed IoT devices, an update campaign update must be created and executed by a management agent on a gateway that is in communication with the IoT devices in a facility. An update campaign can include software update packages that are to be executed by a defined list of devices. For example, the update campaign can correspond software update packages for a subset of registered devices that meet a defined criteria (e.g., all devices with device template X having a name that includes "DEV").

To ensure that device campaign updates run smoothly and to minimize the potential for an update server crash based on a large number of devices requiring an update simultaneously, the present disclosure relates to controlling the amount of active updates that can occur during a given time on devices that are associated with tenants (e.g., organizations) and subtenants (e.g., sub-organizations) in a multi-tenant environment. According to various examples, administrators are allowed to set configurable throttle limits for various update parameters (e.g., number of devices executing an active campaign, amount of data being downloaded, time for completion of campaigns, etc.) which can be used to control how many active updates can occur during a given time for a particular tenant or subtenant.

According to various examples, the software update process can be divided into different lifecycle phases that can be executed in order to ensure consistency and ease of deployment by an administrator once a software update package is obtained by the IoT gateway from a device management service associated with an update server. The lifecycle phases can include but are not limited to an entry point phase, a verification phase, an execution phase, a validation phase, an activation phase, and a reset phase, which can be an optional phase that implements remedial measures if one or more of the other lifecycle phases fails to complete. An update can be considered to be active if it is currently in any one of the lifecycle phases.

According to various examples, when one or more of the assigned limits is exceeded for a given tenant or subtenant, the value of the exceeded limit can be increased to handle the additional load by leveraging an excess that may be allotted to a peer subtenant. For example, assume a tenant is permitted to execute an update campaign on 1000 devices and that the limit is distributed among subtenants such that subtenant A is permitted to execute an update on 600 devices and subtenant B is permitted to executed an update on 400 devices. If there are 700 devices in subtenant A that qualify for the update based on the defined criteria, and only 200 devices in subtenant B that qualify for the update, tenant A can leverage the excess associated with subtenant B to execute the update on all qualifying 700 devices associated with subtenant A.

In some examples, devices can be registered with a device management service after an update campaign has begun. Following a predefined period of time, the device management service may reevaluate the registered devices that qualify for the update campaign based on the defined criteria. If additional devices are identified based on the newly registered devices, the device management service can determine whether the number of active updates for a given organization will be impacted by the additional devices according to the assigned throttle limits. For example, the addition of the newly registered devices to an update campaign may result in the throttle limits being exceeded for a given tenant or subtenant. As such, the device management service can determine if there is an excess of update resources (e.g., number of active devices, time, allowed data download amount, etc.) associated with a subtenant peer and redistribute, accordingly.

In some examples, a capacity detection service associated with the update server that initiates the update campaigns can monitor the update server and the network(s) used to communicate with the registered devices to detect capacity of computing resources (e.g., compute, memory, storage, network, etc.) that may affect the limits assigned to the different tenants and subtenants. For example, a device management service can use the detected capacity to determine and generate recommendations for throttle limits that administrators can use to set and/or modify the throttle limits for the different update parameters.

As illustrated in FIG. 1, shown is a networked environment 100 according to various embodiments. The networked environment 100 includes a computing environment 103, an internet of things (IoT) gateway 106, and a number of IoT endpoints 109a-n. The computing environment 103, the IoT gateway 106, and the IoT endpoints 109a-n can be in data communication with each other. For example, multiple IoT endpoints 109a-n can be in data communication with each other or with an IoT gateway 106 over a local area network (LAN) 112. The IoT gateway 106 can in turn be in data communication with the computing environment 103 over a wide area network (WAN) 115.

The LAN 112 represents a computer network that interconnects computers within a limited area or a limited logical grouping. For example, the LAN 112 could include a wired or wireless network that connects computing devices within a building (such as a residence, office, school, laboratory, or similar building), collection of buildings (such as, a campus, an office or industrial park, or similar locale etc.), a vehicle (such as an automobile, an airplane, train, a boat or ship, or other vehicle), an organization (such as devices with network connectivity owned or leased by an organization), a sub-organization of the organization, or other limited area or limited grouping of devices.

The WAN 115 represents a computer network that interconnects computers that are members of separate LANS 112. Accordingly, the WAN 115 can correspond to a network of networks, such as the Internet.

The LAN 112 and the WAN 115 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless WI-FI® networks, BLUETOOTH® networks, microwave transmission networks, as well as other networks relying on radio broadcasts. The LAN 112 or the WAN 115 can also include a combination of two or more networks.

The computing environment 103 can include, for example, a server computer or any other system providing computing capability. Alternatively, the computing environment 103 can employ a plurality of computing devices that can be arranged, for example, in one or more server banks, computer banks, or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various embodiments. The components executed on the computing environment 103, for example, can include a device management service 118, a capacity detection service 121, and a management console 124, and other applications, services, processes, systems, engines, or functionality not discussed in detail herein.

The device management service 118 can oversee the operation of IoT gateways 106 and IoT endpoints 109 enrolled with the device management service 118. The device management service 118 can further cause device records 127 to be created, modified, or deleted (such as in response to enrollment or unenrollment or registration of an IoT endpoint 109). Commands issued by the device management service 118 for IoT endpoints 109 or IoT gateways 106, such as to apply settings or perform specific actions, can be stored in the command queue 130 by the device management service 118. As discussed later, the IoT gateway 106 can retrieve and execute any commands stored in the command queue 130. The device management service 118 can further create update campaigns based on administrator parameters and initiate the software update process on the qualifying devices by storing commands in the command queue.

According to various embodiments, the device management service 118 can control the amount of active updates occurring for an update campaign based on subtenant throttle settings 136 assigned to subtenants for a given root tenant or organization. The subtenant throttle settings 136 can be defined by an administrator of the root organization. The subtenant throttle settings 136 define limits for different update parameters, such as, for example, an amount of devices executing an active update, an amount of data allowed to be download, an allotted time for an active update, and/or other parameters for a given subtenant of the root organization as can be appreciated. The subtenant throttle settings 136 correspond to a distributed portion of the root throttle settings 138 that are defined for the root tenant or organization. In some examples, the device management service 118 can generate recommendations for root throttle settings 138 and/or subtenant throttle settings 136 based on detected capacity for computing resources associated with the computing environment 103 and/or network 115. It should be noted that although the device management service 118 is discussed herein as being able to register and manage devices with the device management service 118 as well as redistribute resources among subtenants and provide recommendations for throttle settings, in some examples, a distribution service, or other application, redistributes the resources and provides recommendations while the device management service 118 registers and manages the devices.

The capacity detection service 121 can monitor the computing components of the computing environment 103 and/or network 115 to detect capacity associated with computing resources, such as, for example, memory, compute, network, and/or other computing resources. For example, the capacity detection service 121 can include functionality that is similar to VSphere™ High Availability (HA), VMware Distributed Resource Scheduler (DRS), VMware vCenter™ Server, and other VMware VSphere™.

According to various examples, the capacity detected by the capacity detection service 121 can be used as one or more factors in generating recommendations to provide to administrators of an enterprise organization with respect to throttle settings that define update parameters for updating devices in a campaign. For example, based on the detected capacity, the device management service 118 can determine update parameters, such as, a maximum number of devices and/or maximum data download amount that can be used by the particular tenant or subtenant to avoid compromising of the computing environment 103 and/or network 115. In this example, the device management service 118 can determine that, based on the detected capacity associated with the computing environment 103 or other update servers, an organization can be allowed to actively update 1000 devices for an update campaign 147. Based on the recommended update parameters, the administrator can divide the recommended amount among the various sub-organizations to define the subtenant throttle settings 136, as can be appreciated. In a multi-tenancy environment, the recommendation may be based on the detected capacity in addition to the requirements of the other tenants sharing the same instance of the device management service 118 or other application in the computing environment 103.

The management console 124 can provide an administrative interface for configuring the operation of individual components in the networked environment 100. For example, the management console 124 can provide an administrative interface for the device management service 118. The management console 124 can also provide an interface for the configuration of device campaigns 133 containing software update packages that are applicable to IoT endpoints 109. The management console 124 can also provide an interface for the configuration of root throttle settings 138 and subtenant throttle settings 136 which define update parameters for update resources that are allotted to the different sub-organizations in an enterprise organization. Accordingly, the management console 124 can correspond to a web page or a web application provided by a web server hosted in the computing environment 103.

Also, various data is stored in a data store 139 that is accessible to the computing environment 103. The data store 139 can be representative of a plurality of data stores 139, which can include relational databases, object-oriented databases, hierarchical databases, hash tables or similar key-value data stores, as well as other data storage applications or data structures. The data stored in the data store 139 is associated with the operation of the various applications or functional entities described below. This data can include tenant data 141, and potentially other data.

The tenant data 141 can include data associated with the different tenants (e.g., root organizations) that employ the services of the device management service 118. For example, an instance of the device management service 118 can service multiple different organizations, or customers, and sub-organizations by providing shared access to the device management service 118 while maintaining isolation among the different tenants and/or subtenants. The tenant data 141 can include subtenant data 144, root throttle settings 138, update campaign(s) 147, a command queue 130, and potentially other data.

The subtenant data 144 can include data associated with different organizations or sub-organizations of a tenant registered with the device management service 118. For example, the subtenant data 144 can include a device record 151, subtenant throttle settings 136, priority data 154, and potentially other data.

A device record 151 can represent an IoT endpoint 109 enrolled with and managed by the device management service 118. Accordingly, a device record 151 can be created by the device management service 118 in response to enrollment of a respective IoT endpoint 109. Therefore, each device record 151 can include a device identifier 157, one or more device properties 160, and potentially other data associated with an enrolled IoT endpoint 109.

A device identifier 157 can represent data that uniquely identifies an IoT endpoint 109 with respect to another IoT endpoint 109 and, therefore, allow one to uniquely identify one device record 151 with respect to another device record 151. Examples of device identifiers 157 include media access control (MAC) addresses of network interfaces of individual IoT endpoints 109, globally unique identifiers (GUIDs) or universally unique identifiers (UUIDs) assigned to enrolled IoT endpoints 109, international mobile equipment identifier (IMEI) numbers assigned to cellular modems of IoT endpoints 109, and tuples that uniquely identify an IoT endpoint 109 (such as a combination of a manufacturer name and serial number). However, other information can also be used as a device identifier 157 in various implementations.

A device property 160 can represent information related to or regarding an IoT endpoint 109. In some instances, a device property 160 can reflect the status of an IoT endpoint 109 or a component of an IoT endpoint 109. Examples of device properties 160 can include information about the IoT endpoint 109 itself, such as the manufacturer, model name and model number, model revision of the IoT endpoint 109. Similarly, device properties 160 can include information such as identifiers of software packages 163 installed on the IoT endpoint 109, version information for software packages 163 installed on the IoT endpoint 109, and potentially other information. In some examples, device properties 160 can include data that identifies the sub-organizations of the enterprise organization that is associated with the IoT endpoint 109.

The subtenant throttle settings 136 can include settings defining configurable throttle limits for various update parameters (e.g., number of devices executing an active campaign, amount of data being downloaded, time for completion of campaigns, etc.) which can be used to control how many active updates can occur during a given time for a particular tenant or subtenant. The subtenant throttle settings 136 correspond to a portion of the root throttle settings 138 defined for a root tenant or organization. For example, if the root throttle settings 138 define the number of devices executing an active campaign to be 1000, the subtenant throttle settings 136 for subtenant A may include 600 device while the subtenant throttle settings 136 for subtenant B may include 400 devices.

The subtenant throttle settings 136 can be predefined by an administrator of the root organization and can be used to regulate the update resources (e.g., number of devices, number of downloaded data, etc.) used by a subtenant during an update campaign. By regulating the update resources during an update campaign for a given sub-organization, the amount of active updates occurring can be controlled and the overall system can be improved by minimizing update failures, download speeds, and/or other issues that can result in response to an overactive update campaign.

The priority data 154 can include a setting indicating the priority of subtenants relative to other peer subtenants for a given root organization. For example, assume that a root enterprise organization comprises Company A. Within Company A, there are multiple different sub-organizations (e.g., Accounting SubOrg, IT SubOrg, Human Resources SubOrg, etc.). According to various examples, the different sub-organizations can be assigned a priority by the administrator of the root organization. The priority can be used by the device management service 118 to determine which sub-organizations of the root organization can be used to redistribute a surplus of update resources when another organization has been determined to exceed the assigned throttle limits.

An update campaign 147 can represent one or more software update packages 163 that are to be assigned to an identified set of IoT endpoints 109. Accordingly, the update campaign 147 can include a distribution list 166 that includes device identifiers 157 identifying device records 151 for IoT endpoints 109 subject to the device campaign 147, a software update package 163, and/or other information. Other information can also be stored in an update campaign 147 as desired for individual implementations. In some implementations, the update campaign 147 can also include a software update package identifier that identifies the software update package 163 associated with the campaign.

The distribution list 166 identifies the registered devices that are subject to the update campaign 147. The registered devices that are a subject to the update campaign can include registered devices that include characteristics that match a predefined criteria. For example, the criteria can be defined by an administrator requesting creation of the update campaign 147, and can include device template (e.g., type of device, how the device was registered, etc.), a name included in the device name, an organization associated with the device, or other criteria that can be used to identify a device for a given update campaign 147.

A software update package 163 can be created with a package tool and bundles a software executable for installation on an IoT endpoint 109, a manifest file that specifies what is contained within the software update package 163, and one or more lifecycle scripts. In one implementation, each lifecycle phase can have a corresponding script that can be executed on the IoT endpoint 109 to perform the tasks associated with the phase. The software executable can comprise an installer or a firmware image that can be installed onto IoT endpoints 109 associated with the update campaign 147.

In some instances, the software update package 163 can include an executable program that, when executed by an IoT endpoint 109, installs or updates a respective application on the IoT endpoint 109. In other instances, the installer represents a package of files that, when unpacked by an application executing on the IoT endpoint 109, results in the installation of the respective application. Examples of software packages include MICROSOFT WINDOWS® MSI and PPKG files, REDHAT® Package Manager (RPM) files, DEBIAN® installer files, ANDROID® Package (APK) files, and similar package formats for applications of device firmware. A software update package 163 can include various metadata, such as a version identifier. The version identifier can indicate the version of the software update package 163 in order to differentiate between older and more recent versions of the software update package 163.

A command queue 130 can represent a queue of commands sent from a device management service 118 to an IoT management agent 169. When the device management service 118 sends a command or instruction, such as a command to apply a software update specified in an update campaign 147 to an IoT endpoint 109, the command can be stored in the command queue 130 until the IoT management agent 169 retrieves the command from the command queue 130. In some instances, a dedicated command queue 130 can be created for each instance of an IoT management agent 169. In other instances, however, a single command queue 130 can be used to store commands intended for multiple IoT management agents 169. An IoT endpoint 109, update campaign 147, or IoT gateway 106 can be associated with their own respective command queue 130.

The IoT gateway 106 represents a computing device that acts as a proxy or relay between IoT endpoints 109a-n and the device management service 118. For example, an IoT gateway 106 can represent a network access point or interface between the local area network 112 and the wide area network 115. In other instances, the IoT gateway 106 can be a dedicated device attached to the LAN 112 that communicates across the WAN 115 with the device management service 118 on behalf of IoT endpoints 109 attached to the LAN 112.

An IoT management agent 169 can be executed by the IoT gateway 106 to perform various functions on behalf of the IoT endpoints 109a-n. For example, the IoT management agent 169 can register or enroll IoT endpoints 109a-n with the device management service 118. As another example, the IoT management agent 169 can download, process, and enforce one or more applicable compliance policies. For instance, the IoT management agent 169 can retrieve a command from the command queue 130. The command can instruct the IoT management agent 169 to obtain a software update package 163 for a particular device campaign 147 and roll an update to IoT endpoints 109. Accordingly, the IoT management agent 169 could then download the specified version of the software update package 163 for installation on IoT endpoints 109.

The gateway data store 172 can be representative of a plurality of gateway data stores 172, which can include relational databases, object-oriented databases, hierarchical databases, hash tables or similar key-value data stores, as well as other data storage applications or data structures. The data stored in the gateway data store 172 is associated with the operation of the various applications or functional entities described below. This data can include one or more device records 151 of respective IoT endpoints 109a-n, any applicable compliance policies, and software update packages 163 obtained from the device management service 118 for rollout to IoT endpoints 109.

An IoT endpoint 109 is representative of any internet connected embedded device, appliance, sensor, or similar smart device. Examples of IoT endpoints 109 can include network connected home appliances (such as locks, refrigerators, thermostats, sprinkler controllers, smoke detectors, garage door openers, light-switches, fans, lights, security cameras, or similar devices), vehicular electronics (such as on-board diagnostic computers, entertainment systems, access controls, or similar devices), and other similar network connected devices. IoT endpoints 109 are often distinguishable from other client devices (such as personal computers or mobile devices) by their lack of functionality. For example, IoT endpoints 109 often do not provide general purpose computing abilities, lack an operating system that allows for a remote management service to gain direct administrative control over the IoT endpoint 109, and/or IoT endpoints 109 are not configured or configurable to execute an IoT management agent 169.

Often, an IoT endpoint 109 can also store a device identifier 157 that uniquely identifies the IoT endpoint 109 and one or more device properties 160. In some instances, one or more of these values can be set by the manufacturer. In other instances, one or more of these values can be set or specified by the device management service 118. An IoT endpoint 109 can run a particular operating system or shell environment that permits the execution of lifecycle scripts that correspond to the different lifecycle phases. The IoT endpoint 109 can also include a filesystem in which files obtained the IoT Gateway 106 can be stored.

Figure 2:
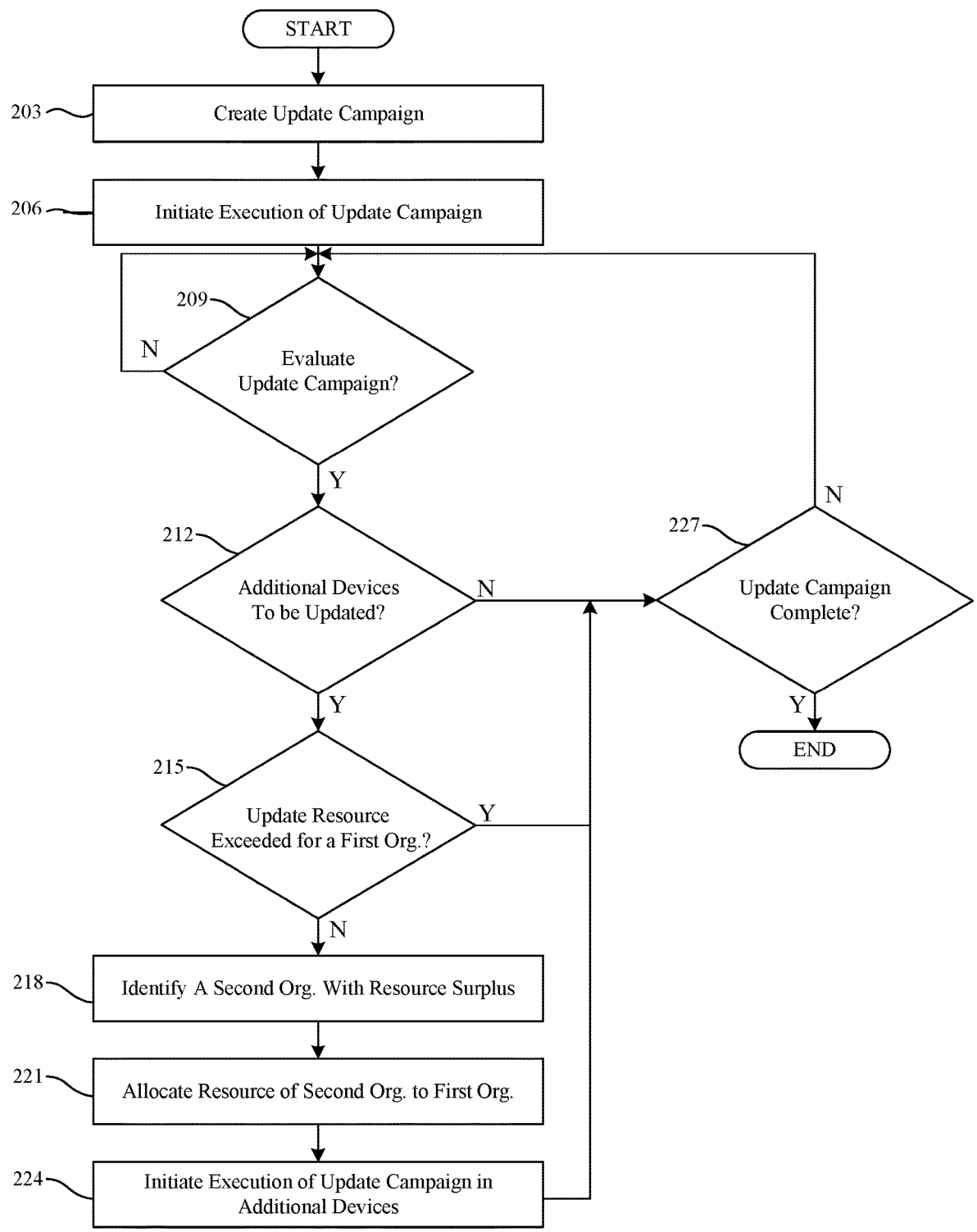
FIGS. 2-5 are flowcharts depicting examples of the operation of components of the network environment of FIG. 1.

Referring next to FIG. 2, shown is a flowchart that provides one example of the operation of the device management service 118. FIG. 2 provides merely an example of the many different types of functional arrangements that can be employed to implement the operation of the device management service 118. As an alternative, the flowchart of FIG. 2 can be viewed as depicting an example of elements of a method implemented in the computing environment 103. FIG. 2 illustrates how the device management service 118 creates an update campaign and redistributes update resources between sub-organizations (e.g., subtenants) when one sub-organization exceeds an allotted amount of an update resource defined by subtenant throttle setting 136.

Beginning at step 203, the device management service 118 creates an update campaign 147. In particular, the device management service 118 can receive inputs from a user defining the software update packages 163 that are to be part of the update campaign. The software update package 163 can be created with a package tool and bundles a software executable for installation on an IoT endpoint 109, a manifest file that specifies what is contained within the software update package 163, and one or more lifecycle scripts. In one implementation, each lifecycle phase can have a corresponding script that can be executed on the IoT endpoint 109 to perform the tasks associated with the phase. The software executable can comprise an installer or a firmware image that can be installed onto IoT endpoints 109 associated with the update campaign 147. Upon identifying the software update packages 163, the device management service 118 can upload the update package 163 that is to be delivered to the registered devices subject to the update campaign 147.

In addition, the device management service 118 can receive inputs from the user defining criteria that is used to identify which registered devices are to be included in the update campaign. For example, the criteria can include a device template type (e.g., device properties), a name included in the device name, an organization associated with the device, or other criteria that can be used to identify a device for a given update campaign 147. The distribution list 166 identifying the qualifying devices can be created based on the identification of the devices that match the criteria. In some examples, the distribution list 116 is generated upon identifying qualifying devices in response to a structured query language (SQL) query that returns a list of all registered devices that match the defined criteria. Once the distribution list 166 is generated and the software update packages 163 are uploaded, the device management service 118 creates the update campaign 147.

At step 206, the device management service 118 initiates the execution of the update campaign 147. For example, the device management service 118 can send a command or instruction, such as a command to apply a software update specified in an update campaign 147 to an IoT endpoint 109. In some examples, the command can be stored in the command queue 130 until the IoT management agent 169 retrieves the command from the command queue 130. In other examples, the device management service 118 can push the command to apply a software update specified in the update campaign 147 to IoT management agent 169 of the IoT gateway 106.

At step 209, the device management service 118 can determine whether to reevaluate the update campaign 147. In particular, the device management service 118 may reevaluate the updated campaign 147 following a predefined periodic evaluation time. In some examples, the periodic evaluation period can be defined by an administrator. If the predefined periodic evaluation time has elapsed, the device management service 118 will proceed to step 212. Otherwise, the device management service 118 will remain at step 29 and wait until the predefined periodic evaluation time has elapsed.

At step 212, the device management service 118 determines whether additional devices have been registered with the device management service 118 since the start of the update campaign 147. For example, additional devices that match the criteria of the update campaign 147 may not be included in the original distribution list 166 and should be subject to the update campaign 147. In some situations, the device management service 118 can initiate a distribution select query that returns a subset of registered devices that match the criteria in order to identify additional devices to be included in the update campaign 147. If newly registered devices are identified, the device management service 118 proceeds to step 215. Otherwise, the device management service 118 proceeds to step 227.

At step 215, the device management service 118 determines if an update resource exceeds the throttle settings 136 for a first organization due to the addition of the newly registered device. In particular, the device management service 118 can analyze the subtenant throttle settings 136 that correspond to the first organization to determine whether the addition of the additional device(s) will exceed the predefined throttle limits. For example, assume that the subtenant throttle settings 136 indicate that the first organization is limited to updating 100 devices and there are currently 95 devices being actively updated. Further, assume that during the reevaluation, the device management service 118 identifies 20 newly registered devices belonging to the first organization that qualify for the update campaign 147. As such, since the total amount of devices that would be actively updating if the newly registered device were added to the campaign exceed the allotted amount, the device management service 118 will determine that the update resource (e.g., number of active devices) will be exceeded for the first organization. Upon determining that the update resource will be exceeded for the first organization, the device management service 118 proceeds to step 218. Otherwise, the device management service 118 proceeds to step 227.

At step 218, the device management service 118 identifies a second organization with a surplus of allotted update resources. For example, the different sub-organizations, or subtenants, of an organization can be assigned a priority. The device management service 118 can identify a lower priority sub-organization from the first organization and determine if the subtenant throttle settings 136 for the second sub-organization contain a surplus. For example, if the second sub-organization is allotted to have 50 active campaign updates and only 20 of the devices in the second sub-organization are in an active update status, the second organization will have a surplus of 30 update resources associated with an amount of active devices. Since, using the example discussed in step 215, the first organization requires an allotment of at least 15 more devices due to the newly registered devices. The surplus of the second sub-organization satisfies the deficiency of the first sub-organization. If the second sub-organization does not have a surplus, the device management service 118 can evaluate a lower priority sub-organizations, as can be appreciated. In addition, in some examples, the surplus required to satisfy the deficiency of the first organization may be based on an aggregate surplus associated with multiple sub-organizations. After identifying a second sub-organization with a resource surplus, the device management service 118 proceeds to step 221.

In step 221, the device management service 118 can allocate resources from the second sub-organization to the first sub-organization. For example, the device management service 118 can modify the subtenant throttle settings 136 associated with the first sub-organization by increasing the throttle limits of the update parameter associated with allotted active devices using the surplus value that is taken away from the subtenant throttle settings 136 associated with the second sub-organization.

In step 224, the device management service 118 initiates the execution of the update campaign 147 in the additional devices identified during the reevaluation. For example, the device management service 118 can send a command or instruction, such as a command to apply a software update specified in an update campaign 147 to an IoT endpoint 109. In some examples, the command can be stored in the command queue 130 until the IoT management agent 169 retrieves the command from the command queue 130. In other examples, the device management service 118 can push the command to apply a software update specified in the update campaign 147 to IoT management agent 169 of the IoT gateway 106.

In step 227, the device management service 118 determines if the update campaign 147 has completed. As previously discussed, the software update process occurs over various lifecycle stages. During the completion of each stage, the device management service 118 can receive a status from the corresponding IoT gateways 106 indicating the status of the devices being updated. Based on the status updates, the device management service can determine if the update campaign 147 for all devices has completed. If the update campaign is still ongoing, the device management service 118 returns to step 209. Otherwise, the process shown in FIG. 2 proceeds to completion.

Figure 3:
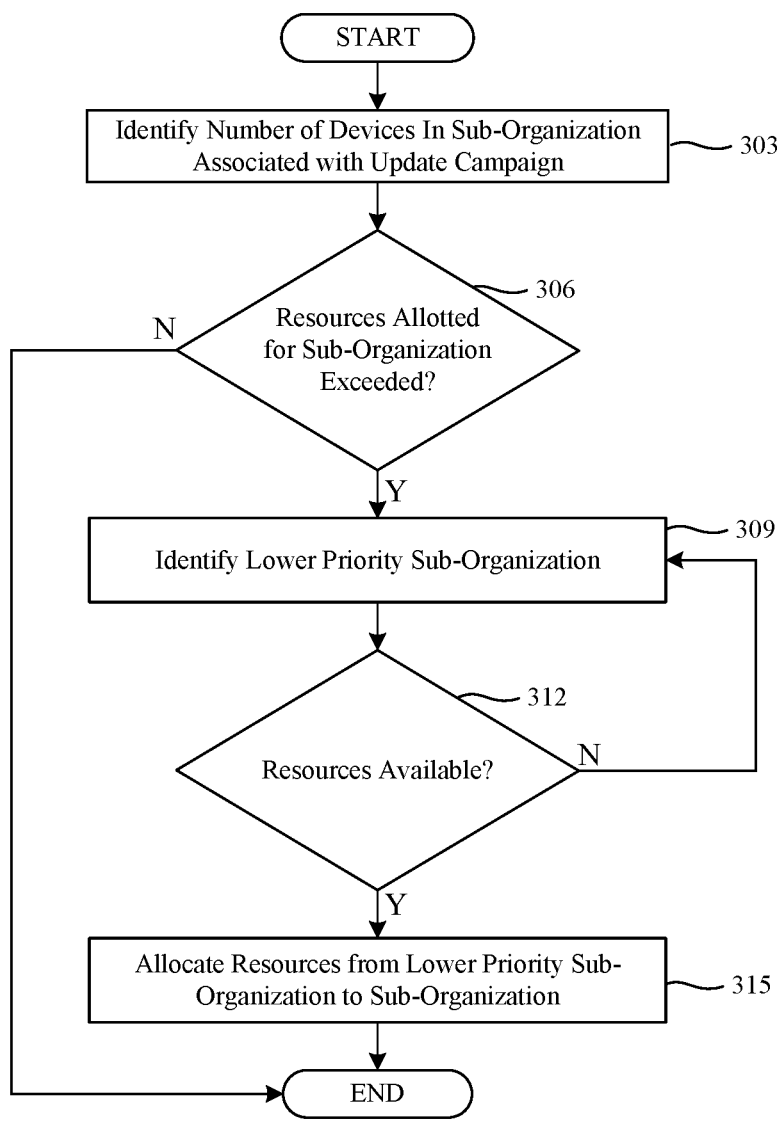

Referring next to FIG. 3, shown is a flowchart that provides one example of the operation of the device management service 118. FIG. 3 provides merely an example of the many different types of functional arrangements that can be employed to implement the operation of the device management service 118. As an alternative, the flowchart of FIG. 3 can be viewed as depicting an example of elements of a method implemented in the computing environment 103. FIG. 3 illustrates how the device management service 118 determines how the resources are redistributed between subtenants when a throttle limit is exceeded for a higher priority subtenant.

At step 303, the device management service 118 identifies a number of devices in a sub-organization associated with the update campaign 147. For example, the distribution list 166 associated with the updated campaign 147 includes a list of devices that are part of the update campaign 147. The device management service 118 can determine the devices for a given sub-organization based on the device properties 160 stored in the device records 151 of the devices listed in the distribution list 166. As such, the device management service 118 can determine the number of devices of the sub-organization that are associated with the update campaign 147.

At step 306, the device management service 118 determines whether the update resources allotted to the sub-organization are exceed. In particular, the device management service 118 can analyze the subtenant throttle settings 136 for the sub-organization and determine if any of the limits will be exceed by the devices executing the update campaign 147.

The update resources can correspond to update parameters defining a number of devices executing an active campaign, an amount of data being downloaded during the update campaign, a time allotted for completion of the campaign, and/or other type of update resource. For example, the device management service 118 may be able to calculate the amount of data to be downloaded during the campaign based on the number of devices that would be executing the update. If the amount of data to be downloaded is determined to be greater than the limit set in the subtenant throttle settings 136, the device management service 118 may determine that the update resource is exceeded.

At step 309, the device management service 118 identifies a lower priority sub-organization. In particular, each sub-organization may be assigned a priority level relative to one another. For example, the SubOrgIT may receive a higher priority level for updates than SubOrgHR. As such, the devices included in SubOrgIT may be updated with a greater priority than the devices in SubOrgHR. The device management service 118 can identify a lower priority sub-organization based on the priority data 154 in the subtenant data 144.

At step 312, the device management service 118 determines if the identified lower priority sub-organization has a surplus of update resources that can be allotted or otherwise shared with the sub-organization that will exceed the update resources during the update campaign 147. In particular, the device management service 118 can review the subtenant throttle settings 136 of the lower priority sub-organization and determine the amount of the update resource being used by the lower-priority sub-organization for the update campaign 147. If there is an adequate surplus based on the comparison, the device management service 118 proceeds to step 315. Otherwise, the device management service 118 returns to step 309 to determine if there is another lower priority sub-organization.

At step 315, the device management service 118 allocates the update resources from the lower priority sub-organization to the sub-organization that exceeds the limits of the update resources to perform the update campaign 147. For example, the device management service 118 can modify the subtenant throttle settings 136 associated with the first sub-organization by increasing the throttle limits of the update parameter associated with allotted active devices using the surplus value that is taken away from the subtenant throttle settings 136 associated with the lower priority sub-organization. Thereafter, the process shown in FIG. 3 proceeds to completion.

Figure 4:
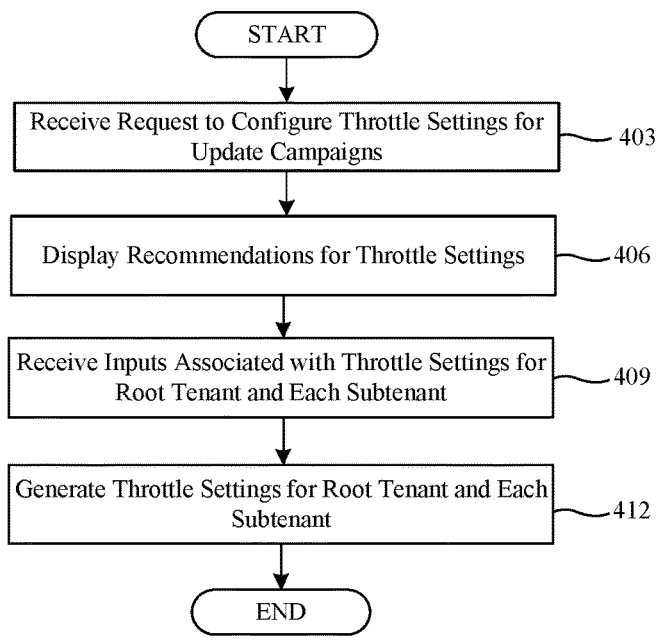

Referring next to FIG. 4, shown is a flowchart that provides one example of the operation of the device management service 118 and management console 124. FIG. 4 provides merely an example of the many different types of functional arrangements that can be employed to implement the operation of the device management service 118 and the management console 124. As an alternative, the flowchart of FIG. 4 can be viewed as depicting an example of elements of a method implemented in the computing environment 103. FIG. 4 illustrates how an administer can interact with the device management service 118 via the management console 124 to define the root throttle settings 138 and subtenant throttle settings 136 for a given root organization and corresponding sub-organizations.

At step 403, the device management service 118 by the management console 124 receives a request to configure throttle settings for update campaigns 147. For example, the management console 124 can provide an administrative interface for the device management service 118 that allows the administrator to configure the root throttle settings 138 and the subtenant throttle settings for a given organization or tenant. The request can be in response to an interaction with a component of the administrative interface that upon user selection indicates the desire to configure the throttle settings for the organization.

At step 406, the device management service 118 displays recommendations for throttle settings for review of the administrator. As will be discussed in further detail in FIG. 5, the device management service 118 can generate a recommendation for throttle settings based on a detected capacity associated with the computing environment 103 and/or the network 115. As such, the recommendations can correspond to a recommendation for root throttle limits based on the detected capacity of the system. In some examples, the recommendation includes a recommendation for root throttle settings 138 for a given tenant. In others examples, the recommendation may include a recommendation for subtenant throttle settings 136 in addition to the root throttle settings 138. The recommendation for the subtenant throttle settings 136 can be based on the root throttle settings 138, a known predefined priority of the subtenants, and/or other factors.

At step 409, the device management service 118 through interactions by a user with the management console 124 can receive inputs associated with the throttle settings for the root tenant and each subtenant. For example, the interface provided by the management console 124 may include components for receiving inputs by the user to indicate desired settings for the throttle settings. In some examples, the user can submit a selectable component that accepts the recommended settings. In other examples, the user can modify the recommended settings.

At step 412, the device management service 118 generates the root throttle settings 138 and the subtenant throttle settings 136 based on the user inputs at step 409. In particular, the root throttle settings 138 define the overall limits for each of the update parameters for the entire organization. In contrast the subtenant throttle settings 136 correspond to a distribution of the overall limits identified in the root throttle settings 138 for each sub-organization of the organization. Thereafter, the process shown in FIG. 4 ends.

Figure 5:
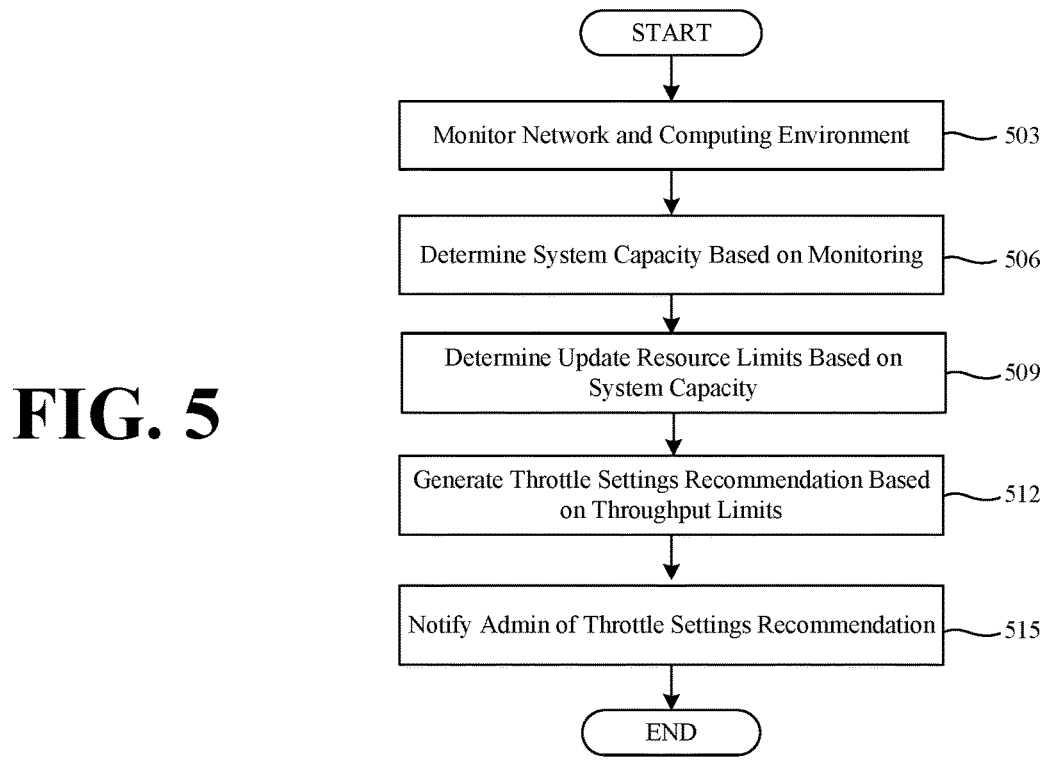

Referring next to FIG. 5, shown is a flowchart that provides examples of the operations of the capacity detection service 121 and device management service 118. FIG. 5 provides merely an example of the many different types of functional arrangements that can be employed to implement the operations of the capacity detection service 121 and device management service 118. As an alternative, the flowchart of FIG. 5 can be viewed as depicting an example of elements of a method implemented in the computing environment 103. FIG. 5 illustrates how the capacity detection service 121 detects a capacity associated with the computing resources of the computing environment 103 and/or corresponding network(s) 115, and how the device management service 118 uses the detected capacity to generate recommendations for throttle settings to present to the administrator.

At step 503, the capacity detection service 121 monitors the computing resources associated with the computing environment 103 and the corresponding network 115. For example, the computing resources can include compute, memory, storage, network activity, network speed, and/or other types of computing resources. The capacity detection service 121 can be in data communication with the various system components of the computing environment 103 and/or network 115 in order to monitor and collect data corresponding to the different computing resources.

At step 506, the capacity detection service 121 can determine a system capacity associated with the computing environment 103 and network 115 based on the monitoring. In particular, the capacity detection service 121 can collect data corresponding to the different computing resources and analyze the data to determine a system capacity. For example, in response to analyzing network speeds associated with the network 115, the capacity detection service 121 can determine a system capacity for transmitting data across the network 115, as can be appreciated. The system capacity can include an amount of data, an available bandwidth, and/or other features. In another example, the capacity detection service 121 can determine a compute capacity for the system which may affect the ability to create and process the commands and instructions associated with the update campaigns 147. In this situation, as the different devices are simultaneously updating the software update package 163, the device management service 118 is involved with monitoring the status as well as providing the data associated with the updates. This activity requires the compute resources of the overall system. As such, understanding the compute capacity can be useful in determining how many active updates the computing environment 103 can support before becoming overwhelmed.

At step 509, the device management service 118 determines update resource limits based on the detected system capacity. For example, the device management service 118 can determine how many devices can be updated at a given time based on the system capacity associated with the computing environment 103 and network 115. In addition, the device management service 118 can determine how much data is to be exchanged for any given update and can determine how much capacity the system can handle for exchanging data with respect to a given update. In some examples, the determination is based on update history data that is collected over time with respect to how the system has responded to prior updates.

In step 512, the device management service 118 generates a throttle settings recommendation based on the detected update resource limits. In particular, the device management service 118 can determine recommended root throttle settings 138 based on an understanding of the capacity of the overall system. In some examples, the networked environment 100 is a multi-tenancy environment in which there are multiple tenants (e.g., organizations) that share access to the same instance of the device management service 118 in isolation. In these situations, the device management service 118 can generate the throttle settings recommendation by distributing the detected update resource limits among tenants. In some examples, the tenants are assigned a priority and the throttle settings recommendation can be determined based on the priority level for each tenant. For example, tenant A may be allotted 55% of the available resource limits and tenant B may be allotted 45% based on the priority levels of the different tenants.

At step 515, the device management service 118 notifies the root organization administrator of the recommended settings. In some examples, the device management service 118 causes the recommendations to be displayed via an interface associated with the management console 124. In other examples, the device management service 118 can notify the root organization administrator of the recommended settings via an electronic message, push notification, or other form of communication. Thereafter, the process shown in FIG. 5 proceeds to completion.

Although the device management service 118, the capacity detection service 121, the IoT management agent 169, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system for redistributing resources between suborganizations during an update campaign, the system comprising:
    at least one computing device; and
    at least one application executable on the at least one computing device, wherein, when executed, the at least one application causes the at least one computing device to at least:
        initiate an update campaign for a first organization, wherein the update campaign is associated with a configurable throttle limit for one or more update resources of the update campaign;
        identify a number of Internet of Things (IoT) devices in a first organization associated with the update campaign;
        determine that the update resources to execute the update campaign exceed the configurable throttle limit for the first organization based at least in part on the update campaign and the number of IoT devices;
        identify a second organization that is a lower priority than the first organization;
        allocate a surplus of the update resources from the second organization to the first organization; and
        execute the update campaign for the first organization based at least in part on the allocated surplus of the update resources.

2. The system of claim 1, wherein the first organization and the second organization are sub-organizations of an enterprise organization.

3. The system of claim 2, wherein the enterprise organization is allotted a predefined number of update resources, and the first organization and the second organization are allotted a subset of the predefined number of update resources.

4. The system of claim 1, wherein the update resources to execute the update campaign correspond to update parameters defining at least one of:
    an amount of data to be downloaded during the updated campaign or a time for completing the update campaign.

5. The system of claim 1, wherein the number of IoT devices are determined based at least in part on a distribution list included in the update campaign.

6. The system of claim 1, when executed, the at least one application further causes the at least one computing device to at least determine that the second organization has the surplus of the update resources, the second organization being identified based at least in part on the surplus.

7. The system of claim 6, wherein allocating the surplus resources from the second organization to the first organization comprises:
increasing the configurable throttle limit associated with the first organization by the surplus associated with the second organization.

8. A method for redistributing resources between suborganizations during an update campaign, comprising:
initiating an update campaign for a first organization, wherein the update campaign is associated with a configurable throttle limit for one or more update resources of the update campaign;
identifying, by at least one computing device, a number of Internet of Things (IoT) devices in a first organization associated with the update campaign;
determining, by the at least one computing device, that the update resources to execute the update campaign exceed the configurable throttle limit for the first organization based at least in part on the update campaign and the number of IoT devices;
identifying, by the at least one computing device, a second organization that is a lower priority than the first organization;
allocating, by the at least one computing device, a surplus of the update resources from the second organization to the first organization; and
executing, by the at least one computing device, the update campaign for the first organization based at least in part on the allocated surplus of the update resources.

9. The method of claim 8, wherein the first organization and the second organization are sub-organizations of an enterprise organization.

10. The method of claim 9, wherein the enterprise organization is allotted a predefined number of update resources, and the first organization and the second organization are allotted a subset of the predefined number of update resources.

11. The method of claim 10, wherein the update resources to execute the update campaign correspond to update parameters defining at least one of:
an amount of data to be downloaded during the updated campaign or a time for completing the update campaign.

12. The method of claim 8, wherein the number of IoT devices are determined based at least in part on a distribution list included in the update campaign.

13. The method of claim 8, further comprising determining that the second organization has the surplus of the update resources, the second organization being identified based at least in part on the surplus.

14. The method of claim 13, wherein allocating the surplus of the update resources from the second organization to the first organization comprises:
increasing the configurable throttle limit associated with the first organization by the surplus associated with the second organization.

15. A non-transitory, computer-readable medium embodying a program for redistributing resources between sub-organizations during an update campaign, wherein when executed by a computing device, the program causes the computing device to at least:
initiate an update campaign for a first organization, wherein the update campaign is associated with a configurable throttle limit for one or more update resources of the update campaign;
identify a number of Internet of Things (IoT) devices in a first organization associated with the update campaign;
determine that the update resources to execute the update campaign exceed the configurable throttle limit for the first organization based at least in part on the update campaign and the number of IoT devices;
identify a second organization that is a lower priority than the first organization;
allocate a surplus of the update resources from the second organization to the first organization; and
execute the update campaign for the first organization based at least in part on the allocated surplus of the update resources.

16. The non-transitory, computer-readable medium of claim 15, wherein the first organization and the second organization are sub-organizations of an enterprise organization.

17. The non-transitory, computer-readable medium of claim 16, wherein the enterprise organization is allotted a predefined number of update resources, and the first organization and the second organization are allotted a subset of the predefined number of update resources.

18. The non-transitory, computer-readable medium of claim 15, wherein the number of IoT devices are determined based at least in part on a distribution list included in the update campaign.

19. The non-transitory, computer-readable medium of claim 15, when executed, the program further causes the at least one computing device to at least determine that the second organization has the surplus of the update resources, the second organization being identified based at least in part on the surplus, and wherein allocating the surplus of the update resources from the second organization to the first organization comprises increasing the configurable throttle limit associated with the first organization by the surplus associated with the second organization.

20. The non-transitory, computer-readable medium of claim 15, wherein the update resources to execute the update campaign correspond to update parameters defining at least one of: an amount of data to be downloaded during the updated campaign or a time for completing the update campaign.

* * * * *